MAGNETIC INFORMATION STORAGE AND READOUT APPARATUS

INVENTORS
JOHN S. JUDGE
JOHN R. MORRISON
DENNIS E. SPELIOTIS

BY John F. Ostendorf
ATTORNEY

United States Patent Office 3,526,881
Patented Sept. 1, 1970

3,526,881
MAGNETIC INFORMATION STORAGE AND READOUT APPARATUS

John S. Judge, Syracuse, N.Y., and John R. Morrison, Broomfield, and Dennis E. Speliotis, Boulder, Colo., assignors to International Business Machines Corporation, Armonk, N.Y., a corporation of New York Continuation of application Ser. No. 562,593, July 5, 1966. This application July 18, 1969, Ser. No. 846,646
Int. Cl. G11c *11/42*
U.S. Cl. 340—174 7 Claims

ABSTRACT OF THE DISCLOSURE

Improved readout of a magnetic storage media by an electron beam is accomplished herein by the addition of a crystalline material operative in accordance with the Bragg diffraction laws. The crystal is placed in the path of the electron beam after the beam has passed through the storage medium. When the beam passes through the storage medium, it is deflected according to the magnetization of the area in the storage medium through which the beam passes. Two different states of magnetization produce two different deflections. The crystalline material responds to an electron beam entering it at one angle to enhance the deflection of the beam. Electron beams entering the crystalline material at another angle are completely absorbed. By placing a target in the beam path after the crystalline material, it is possible to detect which type of magnetization the electron beam passed through when it intersected the storage medium. The electron beam may be a single beam which scans the storage medium, or it may be a very wide beam which floods the entire storage medium. The target may be either a semi-conductive material which detects the presence of the electron beam, or it may be a fluorescent material which is charged by the electron beam. It is also possible to put a reflective surface on the bottom of the crystalline material so that instead of passing a selected electron beam the crystalline material reflects the beam back to a detector.

This application is a continuation of application Ser. No. 562,593, filed July 5, 1966, now abandoned, and the invention relates to high density information storage apparatus, and more particularly, to apparatus for accomplishing the readout of magnetically stored information.

Conventionally, retrieval of magnetically stored information is accomplished by a transducing head which is swept with respect to a recording medium. The readback head has interent disadvantages which become more pronounced as the densities of recording increase. The gap width of the readback transducer; the reluctance offered by this gap width to the flux from the magnetically stored information bits, and the spacing between the transducer and the recording medium all become more critical as the density of recording increases. At high densities all contribute to limit both the resolution and the magnitude of signals transduced from the medium and as a result, such heads cannot be employed for readout of the information stored on the recording medium.

Consequently, it has been proposed to accomplish readout of magnetically stored information by observing the magnetization domains of opposite polarity in the recording medium. These methods rely on the transmission of a beam of electrons through the recording medium. Dependent on the magnetization of the domains at the various locations in the medium, the electron beam is deflected in one or the other direction. Detection is made of the electrons transmitted through the medium to monitor and ascertain the character of the information stored in the recording medium. The present invention is of the same general type and is specifically directed to the improvement of this readout technique. This is accomplished by intercepting the electrons transmitted through the medium and then either enhancing the deflection imparted to them or inhibiting it.

Accordingly, it is a primary object of the invention to provide an improved technique for accomplishing readout of information magnetically stored at high densities.

It is another object of the invention to accomplish the readout of information stored at high densities by relying on the Lorentz effect and by increasing the contrast and resolution of the electrons transmitted through the recording medium.

It is a further object of the invention to provide a technique for reading out magnetically stored information by masking out the manifestations of one type of recorded information and by enhancing the resolution and contrast of the manifestations of the other type of magnetically stored information.

In accordance with an aspect of the invention, the foregoing objects are accomplished by providing a magnetic recording medium having information recorded on it as opposing magnetization manifestations. The recording medium is positioned with respect to crystalline means that are capable of sustaining Bragg diffractions. Means are provided for scanning an electron beam to selected discrete spots of the medium. Means are also provided for collecting certain of the electrons transmitted through the medium and diffracted by the crystalline means.

According to a feature of the invention, the recording medium is a thin film magnetic material deposited on a crystal substrate. To accomplish readout from this recording medium, a scanning electron beam is directed at the recording medium. The electrons are transmitted through the medium. Those electrons satisfying Bragg's Law are projected for detection at a collecting device. The collecting device can be a fluorescent plate which can be readout by conventional scanning techniques, or it can be a current collector. It is also contemplated that the crystalline structure can be a semi-conductor device and thus provide a built-in amplifier structure for the readout of the information.

The foregoing and other objects, features and advantages of the invention will be apparent from the following more particular description of a preferred embodiment of the invention, as illustrated in the accompanying drawings; wherein.

Readout of magnetically stored information is performed accroding to the principles of the invention by employing the known relationships that exist between electric charges and magnetic fields. Thus, the Lorentz force is one such fundamental interaction between electric charges and magnetic fields. This relationship may be expressed as the force exerted on any electrically charged particle moving through a magnetic field. The force is perpendicular to the direction of motion of the charged particle and the direction of the field. This interaction may be expressed as follows:

$$F=\frac{4\pi e}{c}(v\times B)$$

where F is the force; $e$ the electric charge of a particle; $v$ the velocity of the electron; $c$ the velocity of light and B the intensity of the emanating magnetic field.

The force that is exerted causes a deflection to occur in the charged particles that depends on the direction of the magnetization encountered by the particles. Thus, a magnetic material having binary information stored as opposing directions of magnetization causes two distinct trains of charged particles to be emitted from the material with angular displacements from the angle of incidence of the original beam. The amount of angular deflection of the particles from each other is less than one degree. To read out the stored information these angular deflections are monitored and the particles acted on according to the particular direction of deflection.

In this invention, the Lorentz phenomenon is enhanced by intercepting and inhibiting the charged particles having one deflection after they have passed through the stored medium and by enhancing the deflection imparted to the charged particles having the other deflection.

Figure 1:
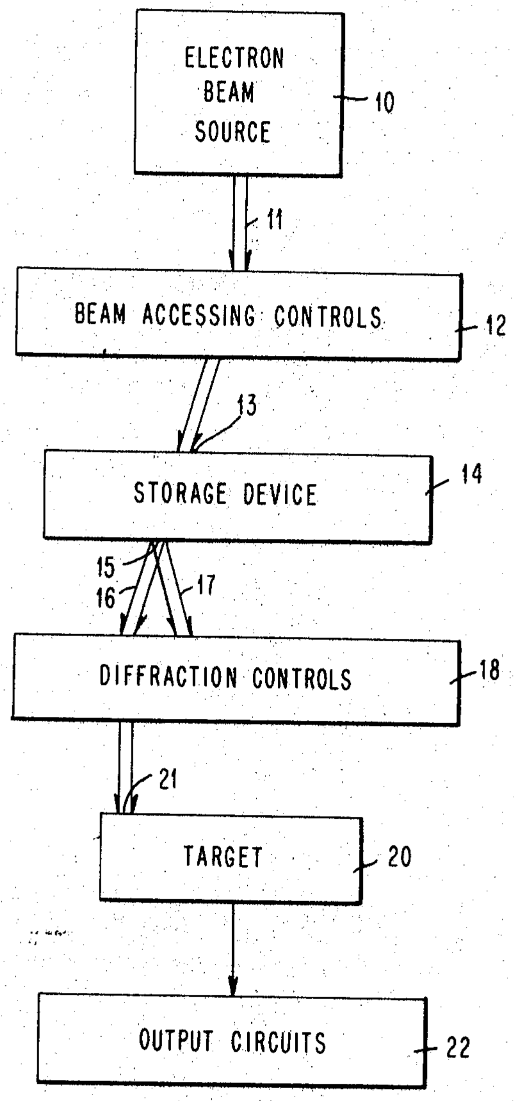
FIG. 1 is a schematic diagram in block form illustrating the general principles of the invention.

Apparatus is schematically indicated in block form in FIG. 1 for carrying out the principles of the invention. An electron beam source 10 provides a beam 11 which is directed by beam accessing controls 12 to a spot 13 on a magnetic storage device 14. As will be explained more fully hereinafter, the beam may be a finely focused beam which is directed at a particular discrete spot on the storage device 14 or the beam may be applied in a flood-like manner on an area of the storage device 14. For purposes of this description the beam will be considered to be a finely focused beam that is striking a particular spot 13 on a storage device. The spot has a magnetic domain that is capable of storing one bit of binary coded information as manifested by opposite orientations of the magnetization in the domain.

Dependent on the particular magnetic orientation of the spot 13, electrons are emitted from the device at 15 with different angles of deflection. The different angles of deflection are shown with the electrons formed into two distinct beams 16 and 17. These beams are directed at a diffraction control device 18. The diffraction control device 18 acts on the two beams to permit transmission of the beam 16 through the device 18 to a target 20 where the beam impinges at the point 21.

The second beam 17 of electrons emitted by the storage device 14 is acted on by the diffraction control device 18. These electrons are reflected within the device 18 and are scattered and absorbed. There is no transmission of this beam through the device 18 to the target 20. Effectively, the diffraction control device 18 acts on the beam 16 to enhance the deflection imparted to the electrons by the storage device 14 and to inhibit the passage of the electron beam 17. The beam 16 is monitored at the target 20 and the output circuits 22 provide an indication of the stored information on the device 14.

It is well-known that information stored as opposite magnetization orientations in the magnetic domains of a recording medium can be read out utilizing electron beam techniques. In these schemes, the Lorentz phenomenon is employed so that the electrons of a scanning beam experience opposing types of beam deflections which are monitored to provide an indication of the information stored on the storage device. One such system is described in copending application entitled Magnetic Information Storage Apparatus, Ser. No. 545,476, filed Apr. 26, 1966 in the names of Kump et al. and assigned to the same assignee as this invention. In the scheme described in that application and in the other schemes known in the art monitoring of the discrete beams is performed, or alternatively, one of the beams is eliminated. The above noted application describes a system where an intercepting element is provided in the path of one beam to collect the electrons of this beam. As is readily apparent, schemes of this type do not incorporate these intercepting or control devices into the storage device structure. In the invention of this application this is accomplished by employing the diffraction control device 18 which is integrally formed with the storage device 14.

The diffraction control device operates according to the Bragg diffraction laws. These laws are well-known in the optics and X-ray arts and are described in detail in the textbook "Geometrical and Physical Optics"—Longhurst, 1962, beginning at page 257, and in the textbook "Introduction to Geometrical and Physical Optics"—Morgan, 1953, beginning at page 279.

For purposes of this description, it suffices to describe the Bragg diffraction laws by saying that any plane in a crystalline structure containing a relatively large number of lattice points is regarded as a deflecting plane. The deflection can take place in a reflecting manner or in a transmitting manner. The crystal is a three-dimensional array of atoms or molecules that is built up of some fundamental unit of structure called a unit cell which repeats regularly and indefinitely in the three dimensions. When a parallel beam of electrons is incident on such a plane at a specific incidence angle that satisfies Bragg's Law, a small fraction of the beam is deflected. If the maximum level of deflected electrons is in phase with the parallel electron beam the Bragg Law is satisfied and when monitored an indication of the stored information in one type of domain is provided. The electrons striking the other types of domains do not satisfy the Bragg Law and are scattered within the crystal or reflected so as not to be detected either in a reflecting or a transmitting manner.

Figure 2:
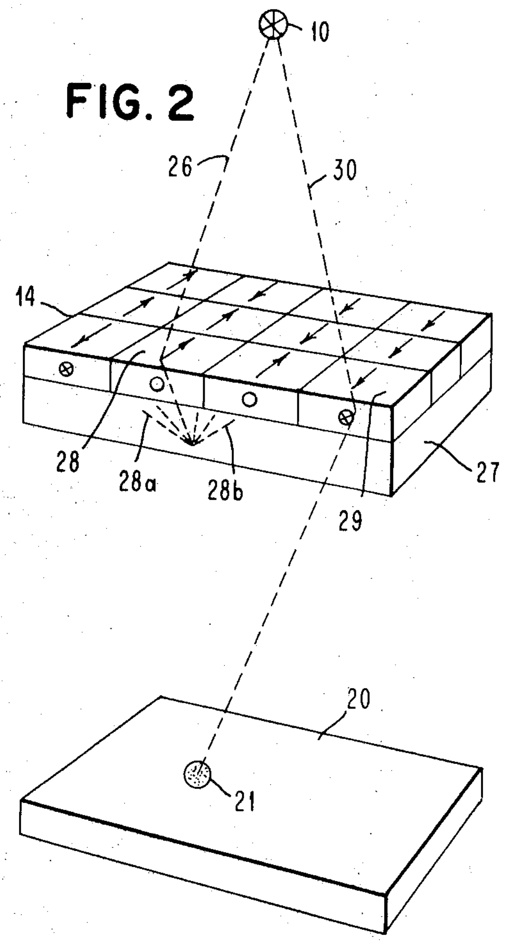
FIG. 2 is a perspective view of the storage device and collecting target according to one form of the invention.

Referring now to FIG. 2, a first beam of electrons 26 is provided by the source 10 in a finely focused manner for striking one domain or spot 28 of the storage device 14. The storage device 14 can be formed of any magnetic thin film that is deposited on a substrate. The film may be a permalloy formed of a nickel-iron, composition preferably in a 5:1 ratio on the substrate by electroless plating, electroplating and vacuum deposition. It can also be a cobalt layer deposited to a thickness of about 500 angstrom units by vacuum deposition or by a gaseous decomposition. Any of these methods may be used to deposit the magnetic film directly on the crystal 27 which accomplishes the diffraction control. This film is preferably less than 500 angstrom units thick and should not exceed a thickness of 1000 angstrom units. Variations in the ambient temperature should not have any effect on the magnetization of the film.

The substrate 27 which takes the form of a crystalline structure accomplishes the diffraction control in the manner described for the element 18 in FIG. 1. It may be any type of crystalline structure. One such crystal that can be used is a silicon crystal having a thickness which does not exceed 1000 angstrom units.

The storage device is shown in perspective as comprising a plurality of individual magnetic domains or spots each having a magnetization indicated by the direction of the domain. Thus, some of the domains are magnetized in one direction, having an arrow pointed in a substantially upward direction indicating one form of binary information, and the other domains have a magnetization in the opposite direction with the arrow pointing in a substantially downward direction. The beam 26 from the source 10 is directed at the domain 28. The magnetic orientation of this domain causes a deflection of the beam as it passes through the film. The deflected beam strikes the crystal with an angle which does not satisfy the requirements of the Bragg Law and the electrons in this beam are scattered at 28$a$, 28$b$.

A second beam is provided at 30 by the source 10 and is directed at the domain 29. This beam strikes a domain having a magnetic orientation opposite to that of the domain 28 causing the beam to pass through the film and to strike the crystal 27 with an angle of incidence which satisfies the Bragg Law. Transmission of the beam occurs through the crystal at 29*a* impinging at 21 on the target 20. As already described output circuits are connected to the target 20 for monitoring and detecting the impinging electrons to indicate the presence of a particular bit of information in a designated location of the storage device 14.

In the embodiment of FIG. 2, the target 20 can be a fluorescent light screen which is illuminated when electrons impinge on it, or it may be a conducting plate which is suitably electrically connected to the output circuits to facilitate the monitoring and detection of the information stored in the storage device 14.

In the operation of the apparatus of FIG. 2, the action of the electron beam passing through the domains having opposing magnetizations is such as to cause one to satisfy the Bragg Law and to be transmitted through the crystal for detection at a target; the other is caused to be scattered within the crystal and is therefore not monitored or detected. The deflection of the beam transmitted through the crystal is enhanced providing for easier detection of this beam.

Recording of information in this film may be accomplished in a variety of ways. It is to be understood that the recording of information does not form a part of this invention except insofar as the same apparatus may be employed for recording as well as for readout of the information. Therefore, the manner of performing the recording is not considered to be critical to the invention. As has been stated, the invention is directed to the method and apparatus for accomplishing readout of the information from the storage device.

By way of illustration, however, recording of information in the film may be performed by a thermostrictive type which is described in copending application, Ser. No. 508,680, filed Nov. 19, 1965 in the names of Bertelsen et al. In this type of recording, the direction of magnetization of a region of an anisotropic magnetostrictive material in film form is altered by employing the energy of a magnetizing field in conjunction with the energy of stress produced by an electron beam impinging upon that region.

Another type of recording is described in the dispersion locked memory apparatus of copending application, Ser. No. 378,806, filed June 29, 1964 in the name of H. J. Kump. In this apparatus, a uniaxial anisotropic magnetic film is employed as the storage device. The film is capable of being set to information states by the low strength magnetic field of a focused electron beam.

A third type of storage system employs a magnetic material having a sharp transition in its temperature-coercivity characteristic. When a beam of electrons is directed at a discrete location of the apparatus, the change in transition occurs, bringing about the storage of information in the selected location of the film. This storage apparatus is described in copending application, Ser. No. 458,950, filed May 26, 1965, 3,453,646 in the names of Alstad et al.

A fourth type of storage system also relies on the change of a magnetic parameter of the storage medium to accomplish the storage of information. In this system, however, the storage is accomplished by prebuilding switching forces into the storage medium. When a particular location of the medium is selected by an electron beam, these switching forces bring about the storage of information. This system is described in copending application, Ser. No. 468,356, filed June 30, 1965 in the name of G. Bate.

All of these applications are assigned to the same assignee as the assignee of this application. Any of them is capable of accomplishing information recording on device 14.

Figure 3:
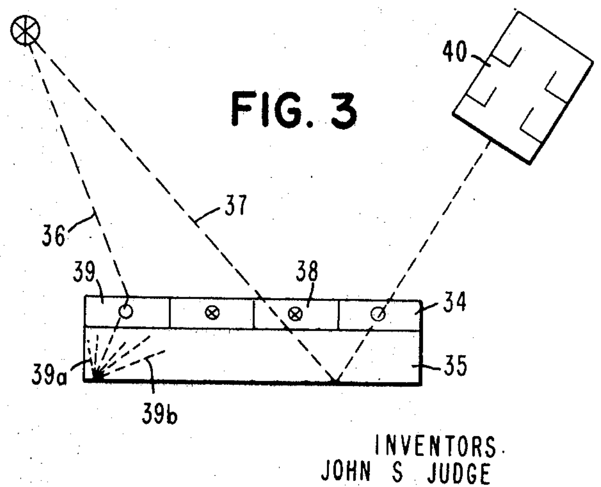
FIG. 3 is a side view of the apparatus according to the invention illustrating the detection of the stored information by monitoring the reflected electrons.

The invention has been described thus far in terms of the transmission of a beam satisfying the Bragg Law through the crystal to be detected at detection means such as the target 20. It is also possible to carry out the principles of the invention by monitoring the reflections of the electrons that satisfy the Bragg Law. As shown in FIG. 3, there is a schematic view of a storage device 34 which is affixed to a crystal 35 in the same manner as described above for the film of FIG. 2. The source of electrons 10 directs a first beam 36 which strikes a magnetic domain 39 having a magnetic orientation of one type. This domain causes the beam to be deflected so that there is scattering at 39*a* and 39*b* within the crystal 35. The beam 37 is directed at a domain 38. Domain 38 has a magnetic orientation of the opposite type. It causes the beam 37 to be deflected so as to enter the crystal 35 at the angle of incidence that satisfies Bragg's Law. It therefore strikes a deflecting plane within the crystal 35 and is reflected back to a suitable detecting device 40. In all respects the mode of operation is the same as for the transmission type of operation except that the reflections of the electrons are monitored rather than the transmission of the electrons.

As already described, the principles of the invention have been carried out by employing a finely focused beam of electrons. However, the scope of this invention is not so limited. The beam can be employed in a flood-like operation to read out an entire area of a storage device at one time. This type of readout is described more particularly in the aforementioned copending application, Ser. No. 545,476, filed Apr. 26, 1966 in the names of Kump et al. and assigned to the same assignee as this invention.

In that application, apparatus is provided for intercepting one of the beams of electrons transmitted from an area of a storage device that is illuminated in a flood-like manner. It is intended that the crystal element described in the other embodiments of this application can be employed to perform this intercepting function and to eliminate one of the beams of electrons, thereby facilitating the readout of an entire area of the storage device in a single operation.

Figures 4, 5, 6:
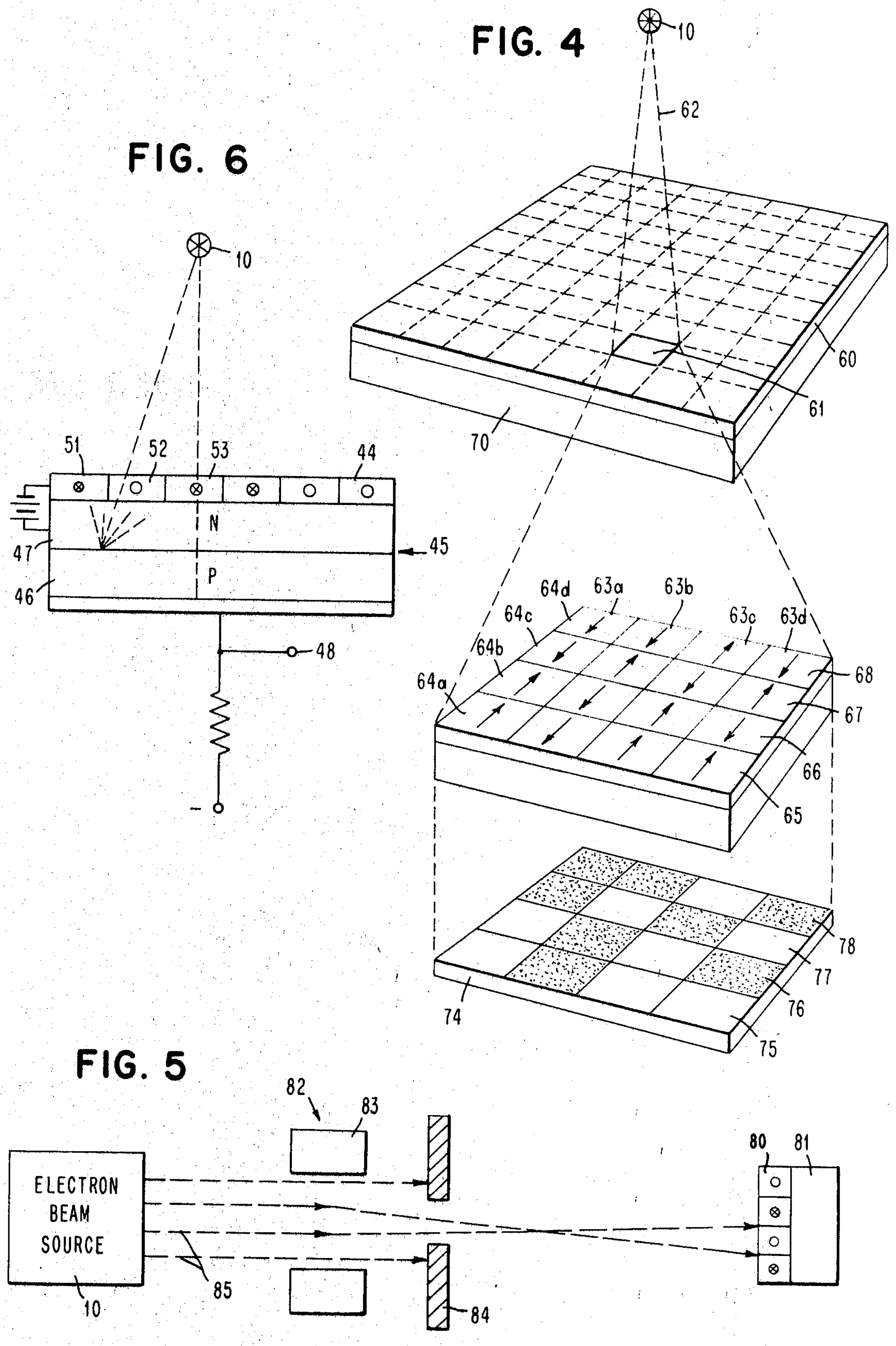
FIG. 4 is an exploded perspective view of a second form of the invention.
FIG. 5 is a side view of shadowing apparatus for use in carrying out the invention; and, FIG. 6 is a modified form of the invention illustrating the recording medium as a part of an amplifier.

Referring to FIG. 4, a storage device 60 is subdivided into a plurality of storage areas such as 61. The areas are arranged in rows and columns. A practical storage device for carrying out the principles of the invention could measure approximately one square centimeter. Each of the areas such as 61 is capable of storing many bits of information in its discrete spots or domains. Thus, for illustrative purposes the area 61 which is flooded by the beam 62 provided by the source 10 is shown in expanded perspective form as comprising the columns 63*a–d* and the rows 64*a–d*, thereby providing 16 distinct spots or domains. These spots, for example 65, 66, 67 and 68, each contain a magnetic domain and therefore each is capable of storing a single bit of binary coded information. The spots 65 and 67 in the column 63*d* have their magnetic domains oriented in a first direction which is indicated as being substantially upward. When electrons from the beam 62 strike the domains of these spots a deflection is imparted to the electrons due to this magnetic orientation. The deflection received by these electrons causes them to enter a crystal 70 formed under the storage device 60 so that they satisfy Bragg's Law and are transmitted through the storage device and through the crystal to a target 74. They strike particular areas of the target 74 as shown at 76 and 78.

On the other hand, electrons from the beam 62 that strike the spots 65 and 67 receive a second type of deflection which causes them to enter the crystal 70 so that they do not satisfy the Bragg Law and therefore are scattered within the crystal. There is no transmission of these electrons to the target 74. The regions of the imaging target 74 corresponding to the spots 65 and 67 of the storage device 60, which spots have magnetic orientations in the upward direction, are not charged as the electrons do not strike these regions.

The imaging target 74 may be a semiconductor surface or a glass surface containing a conductive layer deposited on it. The electrons striking this surface are collected in the particular area. It will be observed that all of the spots of the area 61 of the storage device 60 having magnetic orientations in a substantially downward direction form charged regions on the imaging surface 74 during the readout process. On the other hand, those spots having substantially upward magnetic orientations in the area 61 do not form charged areas.

Electrons striking the imaging target 74 effect only a given region at a particular time. The electric charge that is created in the regions of the target surface is stored for a finite period of time. Discharge may be accomplished by well-known means within one cycle of scanning of the target. Alternatively, the target may be formed of a plurality of discrete regions or areas with each region insulated from its adjacent regions.

To complete the readout of information from this system, a target scanner may be employed which is directed at the opposite side of the imaging target 74. The target scanner may direct a beam of electrons at this opposite or underside of the imaging target. The beam can be controlled so as to scan the surface 74 or it may be controlled to randomly access a given region or area of the surface. The electrons in this beam are controlled so as to be decelerated as they reach the surface of the target at low velocities. If the beam encounters a charged area such as those areas indicated at 76 and 78 it is reflected back to the scanner for detection. An indication is then provided to output circuitry that a particular bit of information is stored at that region. If no charge is stored at the particular region, such as at the regions 75 and 77, then the electrons from the beam are absorbed by the target surface and there is no reflected beam sent back to the scanner. The target scanner therefore provides an indication of this fact to the output circuits.

Referring now to FIG. 5, there is provided an arrangement for controlling the resolution of the beam that strikes the storage device 80 which is affixed to the crystal structure 81. The beam is provided by the source 10 and is directed through a shadowing control generally indicated at 82. It comprises a magnetic lens 83 and a shield 84 which are disposed in the path of the beam 85 so as to block the electrons in the beam 85 that are normal to the shield 84 and to cause the remaining electrons to have improved resolution as they strike the surface of the storage device 80. Control of the electrons striking the storage arrangement is accomplished by the magnetic lens arrangement.

A modified form of the invention is shown in FIG. 6. In this embodiment, the storage device 44 is formed as a thin film on a semiconductor device 45 having P and N type semiconductor materials 46 and 47, respectively. The junctions of the N material 47 with the storage device 44 and the PN junction are suitably biased by electrical connections and an output terminal is connected across the P type component. In this way, as the electron beam sweeps across the storage device 44 encountering the individual discrete spots or domains 51, 52 and 53, a current flow takes place through the device 45 in response to the electrons satisfying the Bragg Law. An output signal is monitored at the terminal 48 to indicate in amplified form the information stored at any particular location of the storage device 44. For those electrons that do not satisfy the Bragg Law, there is no transmission through the PN device and consequently a different level output is provided at the terminal 48 to indicate this state of information. There has thus been provided an amplifier built into a storage device which operates to satisfy the Bragg diffraction laws.

As is apparent, the apparatus of the invention has distinct advantages over systems known in the art. By providing for electron beam readout the compactness of the area density can be increased substantially, thereby enabling considerably more information to be stored in the same unit of space. The electron beam technology has advanced to the state that beams can be focused to spot diameters of less 0.5 micron. Power densities of electron beams up to $10^{10}$ watts per centimeter squared can be achieved while accelerating voltages can be varied from 1 to 100 kilovolts. Switching of the beams to ON and OFF conditions can be accomplished in less than 10 nanoseconds and the beams can be readily deflected electrostatically and magnetostatically by known techniques. The electron beam can be employed to distinguish spots of information that are at most 3000 angstrom units apart or equivalent to a linear storage density of 66 million bits to the inch.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for reading out information stored as plural discrete types of magnetic manifestations on a storage medium, comprising means for accessing the storage medium with a beam of electrons, the manifestations of one of the plural types being responsive to the electron beam to deflect the beam in a first direction and the manifestations of another of the plural types being responsive to the electron beam to deflect the beam in a second direction, a beam diffraction crystal integrally attached to the storage medium for passing the beam deflected in the first direction and for scattering the beam deflected in the second direction, and electron beam detecting means responsive to the electron beams passed by said crystal for indicating the information stored on the medium; said detecting means being mounted adjacent to the crystal surface emitting the electron beams passed by said crystal.

2. The apparatus of claim 1 wherein the means for accessing the storage medium is a source of a finely focused beam of electrons for accessing a single manifestation at a time.

3. The apparatus of claim 2, wherein the accessing means further comprises masking means disposed between the source and the storage medium for controlling the beam striking the medium, whereby the resolution of the beam is enhanced.

4. The apparatus of claim 1, wherein the detecting means comprises semiconductor means integrally attached to said crystal for amplifying the electrical signal created in the semiconductor means by the beam passed by said crystal.

5. The apparatus of claim 1, wherein the means for accessing the storage medium comprises means for directing a flood-like beam of electrons at a plurality of the discrete manifestations.

6. Apparatus for reading out information stored as discrete magnetic manifestations of a first or second type on a storage medium, comprising means for flooding a predetermined region of the medium containing a plurality of the manifestations with an electron beam, so that manifestations of one type cause transmission of a first deviated beam from the medium and manifestations of the second type cause transmission of a second deviated beam from the medium, target means for accepting impinging electrons as charged patterns, a beam diffraction crystal integrally attached to the storage medium for projecting the first deviated beam on the target means as a charged pattern image of the stored information and for inhibiting the passage of the second deviated beam, and means for reading the charged pattern image on said target means to provide an indication of the stored information.

7. Apparatus for reading out information stored as plural discrete types of magnetic manifestations on a storage medium, comprising means for accessing the storage medium with a finely focused beam of electrons, the manifestations of one of the plural types being responsive to the electron beam to deflect the beam in a first direction and the manifestations of another of the plural types being responsive to the electron beam to deflect the beam in a second direction, a beam diffraction crystal integrally attached to the storage medium for reflecting the beam deflected in the first direction and for scattering the beam deflected in the second direction, and electron beam detecting means responsive to the electron beams reflected by said crystal for indicating the information stored on the medium; said detecting means being mounted to monitor the entire crystal surface emitting electron beams reflected by said crystal.

References Cited

UNITED STATES PATENTS 3,247,495 4/1966 Fuller -------------- 340—174

STANLEY M. URYNIOWICZ, Jr., Primary Examiner